H. FISHER.
LADLE.
No. 175,599.
Patented April 4, 1876.
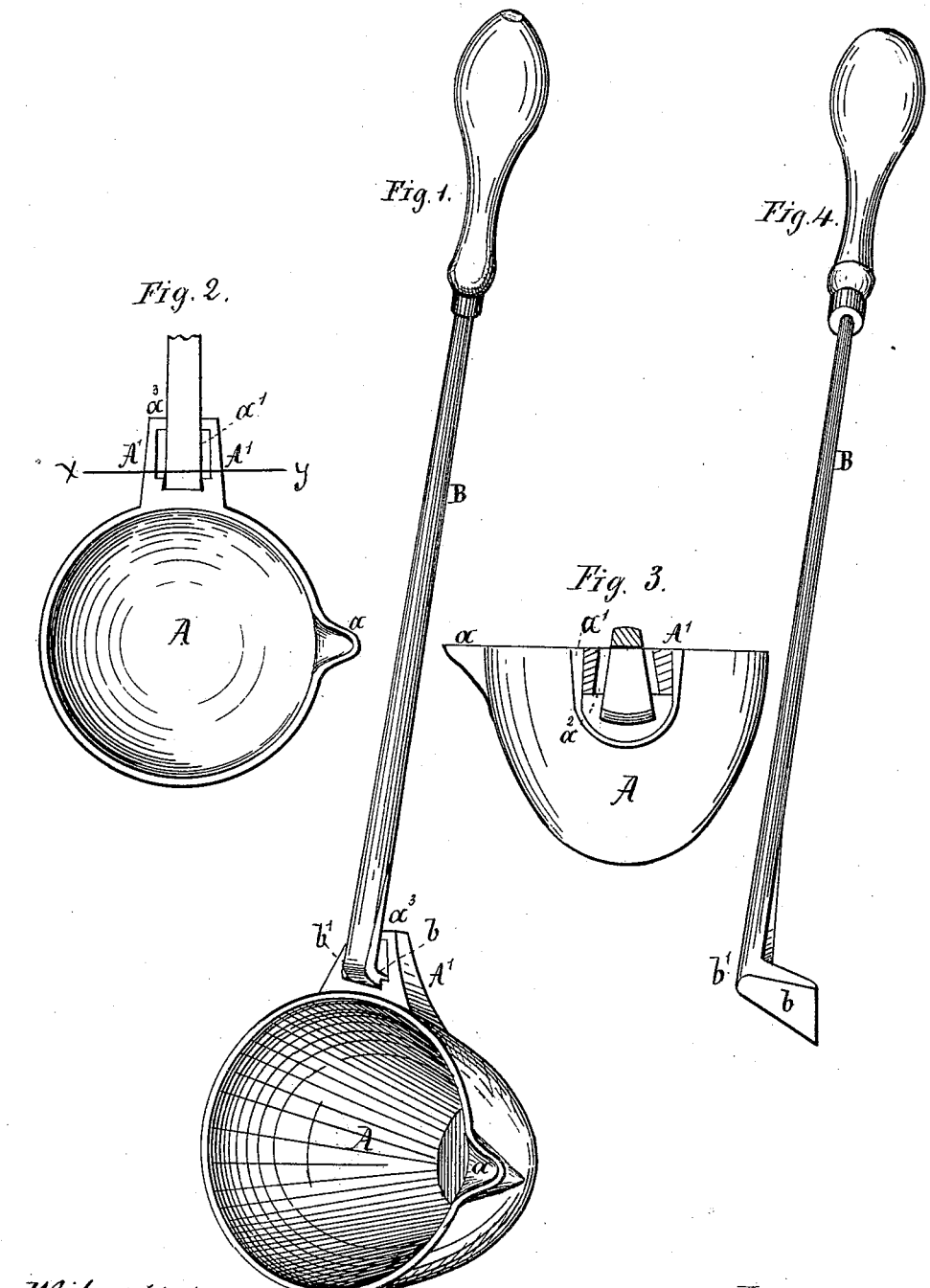

UNITED STATES PATENT OFFICE.

HENRY FISHER, OF CANTON, OHIO.

IMPROVEMENT IN LADLES.

Specification forming part of Letters Patent No. 175,599, dated April 4, 1876; application filed March 3, 1876.

*To all whom it may concern:*

Be it known that I, HENRY FISHER, of Canton, in the county of Stark and State of Ohio, have invented certain new and useful Improvements in Ladles; and I do hereby declare that the following is a full, clear, and exact description thereof, which will enable others skilled in the art to which it appertains to make and use the same, reference being had to the accompanying drawing, and to the letters of reference marked thereon, which form a part of this specification.

Figure 1 is a perspective view of my improved ladle. Fig. 2 is a plan view. Fig. 3 is a view showing the side of the ladle in elevation, and a section of the bracket, taken on the line $x\,y$, Fig. 1, with the shank of the handle in position. Fig. 4 is a detached view of the handle.

The invention relates to a novel construction of the ear or loop at the side of the ladle and of that portion of the handle which engages with this ear or loop, whereby the handle is easily detached, and is more firmly secured in proper position for readily manipulating the ladle in any required manner, as will be hereinafter fully explained.

In the drawings, A is the body of the ladle, provided with a pouring-lip, $a$, or other lip, as may be preferred. A' is an ear or bracket-loop, projecting from one side of the body A. In this ear there are formed irregular-shaped vertical slots or sockets $a^1\,a^2$. The shape of the larger and outer portion $a^1$ of this slot is immaterial, except that it must be large enough to permit the free passage through it of the shank of a handle, to be described. The smaller or inner portion $a^2$ of the socket is, however, made in the form of a dovetail, as seen, both in plan or horizontal section, with its greater diameter next to the body A, as shown in Fig. 2, and also in vertical section, with its greater diameter at the bottom, as shown in Fig. 3.

The handle consists of the stem B, having at its inner end a downwardly-projecting shank, $b$, which is in the form of a wedge, both in horizontal section, as is shown in Fig. 2, and in vertical section, Fig. 3, the size of said shank being such as to fit closely into the dovetailed slot or recess $a^2$, when the parts are in the position shown in Figs. 1 and 3. The outer angle, at the junction of the stem B with the shank $b$, is rounded a little, as at $b'$, Fig. 4.

In removing the handle from the ladle the outer end of said handle is lifted upward, the inner end and shank $b$ being at the same time depressed, until the shank can be removed from the dovetailed recess $a^2$ into the larger outer slot $a^1$, when the shank can be lifted up through said slot $a^1$.

Of course the handle can be replaced by the reverse movement, and when in the proper working position, as in Fig. 1, the shank $b$ will be firmly held by the double dovetail, so that the ladle can be turned into any position which will be ordinarily required without becoming accidentally detached from the handle, while the said handle can be intentionally removed with but little difficulty, as above explained.

Although in practice I prefer to construct the ladle with a closed loop or ear, in order that the rib $a^3$ (see Figs. 1 and 2) may be used as a partial fulcrum or rest for the stem B, thus materially relieving the strain upon the angle at $b'$, yet I do not wish to be confined to the employment of such a rib, as under some circumstances the dovetailed socket or recess $a^2$ may be all that is required.

What I claim is—

1. In combination with the body A of the ladle, provided with the dovetailed socket $a^2$, the handle B $b$, substantially as set forth.

2. In combination with the body A of the ladle, provided with the ear A', having the dovetailed socket or slot $a^2$ and the larger slot $a^1$, the handle B $b$, substantially as set forth.

In testimony that I claim the foregoing as my own I affix my signature in presence of two witnesses.

HENRY FISHER.

Witnesses:
 MARCUS E. WILCOX,
 PERCY S. SOWERS.